(12) United States Patent
Best et al.

(10) Patent No.: US 10,464,139 B2
(45) Date of Patent: Nov. 5, 2019

(54) TOOL, TEMPLATE, CASSETTE, AND METHOD FOR GROOVING A ROLLER

(71) Applicant: Bühler GmbH, Braunschweig (DE)

(72) Inventors: Heidrun Best, Braunschweig (DE); Karsten Santelmann, Gifhorn (DE); Witold Chrzan, Salzgitter (DE); Björn Reupke, Steinlah (DE)

(73) Assignee: Bühler GmbH, Braunschweig (DE)

( * ) Notice: Subject to any disclaimer, the term of this patent is extended or adjusted under 35 U.S.C. 154(b) by 613 days.

(21) Appl. No.: 14/421,791

(22) PCT Filed: Aug. 8, 2013

(86) PCT No.: PCT/EP2013/066639
§ 371 (c)(1),
(2) Date: Apr. 30, 2015

(87) PCT Pub. No.: WO2014/026909
PCT Pub. Date: Feb. 20, 2014

(65) Prior Publication Data
US 2015/0231707 A1 Aug. 20, 2015

(30) Foreign Application Priority Data
Aug. 17, 2012 (EP) .................... 12180862

(51) Int. Cl.
*B23B 29/26* (2006.01)
(52) U.S. Cl.
CPC ........ *B23B 29/26* (2013.01); *B23B 2260/038* (2013.01); *Y10T 82/10* (2015.01); *Y10T 407/2206* (2015.01); *Y10T 407/2272* (2015.01)

(58) Field of Classification Search
CPC .. B23B 2260/038; B23B 29/248; B23B 29/26
See application file for complete search history.

(56) References Cited

U.S. PATENT DOCUMENTS 2,624,099 A    1/1953  Berthiez
3,078,547 A *  2/1963  Sweet ................... B23B 29/248
                                                    407/68
(Continued)

FOREIGN PATENT DOCUMENTS

CN          1406166 A       3/2003
CN        101291764 A      10/2008
(Continued)

OTHER PUBLICATIONS

Chinese Second Office Action issued in corresponding Chinese Patent Application No. 201380054135.X dated Dec. 1, 2016. 9 Pages.

(Continued)

*Primary Examiner* — Sara Addisu
(74) *Attorney, Agent, or Firm* — Davis & Bujold PLLC; Michael J. Bujold (57) ABSTRACT

The tool according to the invention comprises a tool body and a cassette for machining a roller. At least one machining device can be fastened, in particular detachably, onto and/or in the cassette. In particular, the machining device is a cutting device, preferably for grooving a roller. The tool has a positioning device for orienting the cassette in the tool body at a predetermined position.

19 Claims, 7 Drawing Sheets

(56) References Cited

U.S. PATENT DOCUMENTS

| | | |
|---|---|---|
| 3,122,818 A | 3/1964 | Nance |
| 4,510,829 A * | 4/1985 | Kintzel .................. B23B 29/04 |
| | | 82/158 |
| 4,938,110 A * | 7/1990 | Ruby .................... B23B 29/248 |
| | | 407/71 |
| 6,428,453 B1 | 8/2002 | Hoppe et al. |
| 6,880,437 B2 | 4/2005 | Sjöö et al. |
| 7,757,591 B2 | 7/2010 | Trice et al. |
| 8,186,249 B2 * | 5/2012 | Sasu ........................ B23B 3/06 |
| | | 82/1.11 |
| 2004/0191008 A1 | 9/2004 | Noggle et al. |

FOREIGN PATENT DOCUMENTS

| | | |
|---|---|---|
| DE | 156 213 | 11/1902 |
| DE | 605 183 | 10/1931 |
| DE | 703 472 | 2/1941 |
| DE | 949 269 | 9/1956 |
| DE | 1 552 702 | 2/1970 |
| DE | 32 46 158 A1 | 6/1984 |
| DE | 102005024746 A1 | 12/2006 |
| EP | 0564425 A1 | 10/1993 |
| WO | 20050007330 A1 | 1/2005 |
| WO | 20080064656 A1 | 6/2008 |

OTHER PUBLICATIONS

International Search Report dated Nov. 26, 2013.
English Translation of International Preliminary Report on Patentablity dated Feb. 17, 2015.

* cited by examiner

TOOL, TEMPLATE, CASSETTE, AND METHOD FOR GROOVING A ROLLER

This application is a National Stage completion of PCT/EP2013/066639 filed Aug. 8, 2013, which claims priority from European patent application serial no. 12180862.0 filed Aug. 17, 2012.

FIELD OF THE INVENTION

The invention relates to a tool, a template and a cassette for in particular subtractive machining of a workpiece, and to a method for fluting a roller in accordance with the preamble of the independent claims.

BACKGROUND OF THE INVENTION

WO 2008/064656 A1 discloses a cutting tool having a tool carrier and a cassette attached to the tool carrier. A cutting insert is arranged on the cassette. The tool has a wedge mechanism as adjusting means for adjusting the cassette with respect to a longitudinal axis of the tool carrier.

This previously known prior art has the drawback that orienting the cutting insert, i.e. placing the latter in an angular position, relative to the workpiece to be machined, requires in each case a great deal of effort when the cutting insert is changed. In addition, sufficient orienting accuracy, for example for fluting rollers, is not always achievable, and this can possibly result in over-fluting of already cut flutes. Thus, the tool for cutting can usually be used only in one machining direction with sufficient cutting accuracy, this allowing a machining time for the workpiece that is no longer sufficient nowadays.

SUMMARY OF THE INVENTION

It is therefore an object of the present invention to avoid the drawbacks of the known prior art, and thus in particular to provide a tool and a method for roller fluting, the required orienting accuracy for a machining tool being easily and reliably achievable and efficient and time-saving machining of the workpiece being allowed with said tool, and method.

These objects are achieved by a tool and a method in accordance with the independent claims.

The tool according to the invention comprises a tool body and a cassette. The tool is suitable in particular for subtractive machining of a workplace which, is in particular a roller. At least one machining device is fastenable, in particular releasably, to and/or in the cassette. The machining device is in particular a cutting device, preferably for fluting the roller. The tool has a positioning device for orienting the cassette in a predetermined position in the tool body.

This has the advantage that the orientation of the cassette and thus of the machining device, for example the cutting device, can be predetermined for fluting the roller independently of the operator, with the result that higher accuracy in orienting the machining device can be achieved. In addition, operating errors are minimized. For example, provision can be made of a set of cassettes having differently oriented machining tools which the operator selects merely in accordance with requirements. Thus, in addition, the handling of the tool is improved and made easier, since the operator does not have to set the orientation of the machining device or set the position of the machining device substantially along the longitudinal axis of the machining device.

The "positioning device for orienting the cassette" serves in the present case for positioning the cassette in a predetermined angular position in the tool body. Such a positioning device in particular does not serve for positioning the machining device along a longitudinal axis of the cassette or of the tool, i.e. in particular not for adjusting the spacing of a cutting edge, facing away from the tool, of the cutting device.

Preferably, the positioning device comprises a gap arranged on the tool body. This has the advantage that the position of the gap is precisely settable or set, a corresponding element of the cassette being able to engage in said gap in said position in order to orient the cassette in the tool body.

Preferably, a protrusion for engaging in the gap is arranged on the cassette. This has the advantage that the protrusion can engage in the gap in order to orient the cassette in the tool body, wherein the protrusion is easily and reliably producible and arrangeable on the cassette. Thus, high accuracy in orienting the cassette can be achieved with easy handling of the positioning device.

Particularly preferably, the protrusion is connectable releasably to the cassette. This has the advantage that the protrusion is connectable to the cassette in accordance with requirements, thereby reducing the number of cassettes required, and thus lowering the costs, since the cassettes required for example for a production run can be prepared in each case with a machining device and a protrusion.

Alternatively, it is possible to connect the protrusion fixedly to the cassette, for example by welding or soldering. This has the advantage that handling is further simplified and operating errors are avoided even more reliably.

Preferably, the protrusion is arranged or a template, wherein the template has a template opening for receiving the cassette, in particular, the external shape of the cassette is substantially complementary at least sectionally to the shape of the template opening. In particular, the shape of the template opening and the external shape of the cassette are configured such that the template and the cassette are arranged in a particular angular position with respect to one another.

This has the advantage that a combination of template and cassette is usable flexibly. In addition, the number of cassettes required is optionally reduced, this being cost-effective. For example, it is possible for cassettes having an identical arrangement of the machining tools to be mounted and for the orientation of the cassette in the tool to be determined in each case, as required, by way of a combination of template and cassette, by selection of the template.

Preferably, a fastening device for fastening the protrusion in tire gap is arranged on and/or in the gap. In particular, fastening takes place by means of a friction fit.

This has the advantage of an easily configured and reliably functioning manner of fastening the protrusion in the tool body engagement means. For example, this can be achieved by way of screws, which exert a force on opposite lateral faces of the protrusion.

Preferably, a cassette fastening means is arranged on and/or in the tool body. In particular, cassette fastening takes place by means of a friction fit. This has the advantage of reliable fastening of the cassette in the tool body, in a manner which is easy to handle.

Preferably, the cassette has a handle. This has the advantage that handling of the cassette, for example during insertion into the tool body or removal from the tool body, is simplified.

Preferably, the machining device comprises two cutting devices arranged in a row. This has the advantage that more efficient machining is achievable in one machining step, for example a movement of the cutting devices along a roller axis of a roller, since more material is removable in one working step. In addition, the reliability of machining is increased by the two cutting devices arranged in a row.

In the context of the present application, arranging the cutting devices "in a row" is understood as meaning that, with respect to the machining direction for example along a workpiece surface, the cutting devices machine substantially the same regions of the workpiece one after the other.

Particularly preferably, the cutting device facing in the machining direction is at a first spacing from, the tool body smaller than a second spacing of the cutting device facing in the opposite direction to the machining direction, with respect to a longitudinal axis of the tool. In particular, a cutting edge of the cutting device facing in the machining direction is at a smaller spacing from, the tool body that the cutting edge of the cutting device facing in the opposite direction to the machining direction. In particular, the difference in the spacings between the cutting devices arranged in a row is 0.06 ram to 0.1 mm and preferably 0.08 mm to 0.1 mm.

This has the advantage that a groove or a flute with a first depth is cuttable with the cutting device facing in the machining direction and the groove or flute can be deepened further with the cutting device facing in the opposite direction to the machining direction in one working step. In practice, it has been found that a depth of a flute of up to 0.1 mm is usually achievable with one cutting device; thus, as a result of arranging two cutting devices arranged in a row with a difference in height, a flute having a greater depth of for example 0.2 mm is achievable in one working step, thereby making workpiece machining more efficient.

In the context of the present application, a "longitudinal axis of the tool" is understood as meaning an axis substantially parallel to the longitudinal axis of the cutting device.

Preferably, the machining device comprises at least two cutting devices that are arranged substantially parallel to one another. In particular, a first cutting device is arranged for a first machining direction and a second cutting device is arranged for a machining direction substantially opposite to the first machining direction.

This has the advantage that workpiece machining by means of the tool is enabled in a forward movement and a backward movement, thereby making the machining of the workpiece more efficient, since the backward movement is also usable, in contrast to the prior art.

In the context of the present application, a "substantially parallel" arrangement of cutting devices is understood as meaning that the cutting devices are offset laterally with respect to one another with respect to the machining direction and in particular the cutting edges of the cutting devices extend substantially parallel to one another.

Preferably, the machining device comprises two series, arranged substantially parallel to one another, of at least two cutting devices arranged in a row, wherein in particular a first pair of cutting devices is arranged for a first machining direction and a second pair of cutting devices is arranged for a machining direction substantially opposite to the first machining direction.

A further aspect of the present invention relates to a tool for in particular subtractive machining of a workpiece. The tool is in particular a tool as described above. The workpiece is in particular a roller. The tool comprises a tool body for receiving two series, arranged substantially parallel to one another, of at least two cutting devices arranged in a row. In particular, a first pair of cutting devices is arranged for a first machining direction and a second pair of cutting devices is arranged for a machining direction substantially opposite to the first machining direct ion.

This has the advantage of even more efficient machining of workplaces, this being cost-effective, since both machining directions are usable and the tool does not unnecessarily have to be positioned again, without a machining function, at the starting point of the machining of the workpiece, and in addition more material can be removed from the workplace per machining direction.

An additional aspect of the present invention relates to a template for a tool as describe above. The template comprises a protrusion for engaging in a gap in a tool body. The template has a template opening for receiving a cassette. In particular, the external shape of the cassette is substantially complementary at least sectionally to the shape of the template opening.

A further aspect of the present invention relates to a cassette for a tool as described above. The cassette comprises at least one machining device, which is configured in particular as a cutting device. The machining device is receivable, in particular releasably, on and/or in the cassette. A protrusion for engaging in a gap in a tool body is arrangeable or arranged on the cassette.

An additional aspect of the present invention relates to a set comprising at least one template as described above and at least one cassette as described above.

A further aspect of the present invention relates to a method for fluting a roller by way of a tool. In particular, use is made of a tool as described above. The tool comprises a tool body and/or a cassette for receiving two pairs, arranged substantially parallel to one another, of at least two cutting devices arranged in a row. A first pair of cutting devices is arranged for a first machining direction and a second pair of cutting devices is arranged for a machining direction substantially opposite to the first machining direction. The method comprises the step of positioning the first pair on the roller. Next, the roller is rotated about the roller axis in a first direction of rotation b, in particular through an angular section, and the tool is moved substantially at the same time. In particular, the tool is moved by means of a linear drive. The tool is moved along the roller axis in the first machining direction in order to produce a flute in the roller. In particular, the tool is moved along the entire roller length t during the rotation. Next, the second pair is positioned in the flute which in particular was cut in a previous method step. Next, the roller is rotated about the roller axis in a second direction of rotation b, in particular through a negative angular section, and the tool is moved substantially at the same time along the roller axis in the second machining direction along the flute. The second machining direction is substantially in the opposite direction to the first machining direction. In particular, the tool, is moved by means of the linear drive. In particular, the tool is moved along the entire roller length during the rotation of the roller.

This has the advantage of efficient and reliable production of flutes on a roller.

"Rotation through a negative angular section" is understood in the present case as meaning rotation in the opposite direction over the angular section covered in a previous step.

BRIEF DESCRIPTION OF THE DRAWINGS

Further features and advantages of the invention are explained in more detail in the following text for better understanding with reference to exemplary embodiments, without the invention being restricted to the exemplary embodiments. In the drawings.

DETAILED DESCRIPTION OF THE PREFERRED EMBODIMENTS

Figure 1:
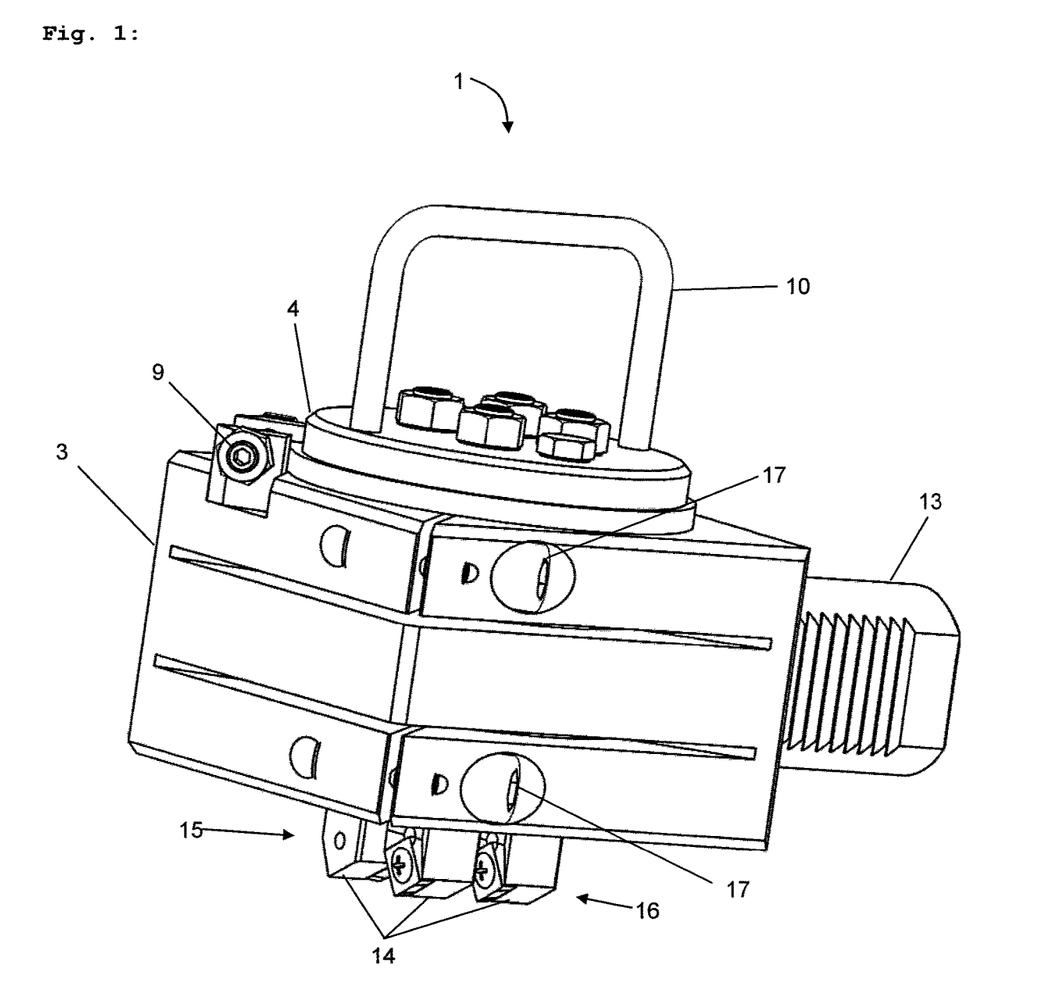
FIG. 1 shows a perspective illustration of a tool according to the invention having a cassette and cutting devices.

FIG. 1 illustrates a perspective illustration of a tool 1 according to the invention. The tool 1 has a tool body 3 for receiving a cassette 4. The tool body 3 comprises a fastening device 9 for fastening a protrusion (not visible here) of the cassette 4 in order to orient the cassette 4 in the tool body 3.

The tool body 3 comprises a cassette fastening means 17 for securely mounting the cassette 4 in the tool body 3. In addition, the tool body 3 has a tool holder 13 comprising a holding arm for receiving in a tool carrier which is operatively connected for example to a linear drive in order to position and machine a workpiece with the tool 1. The tool holder 13 is configured as the VDI type 50 known to a person skilled in the art.

The cassette 4 comprises a handle 10 for easy handling of the cassette 4.

The cassette 4 comprises, as machining device, four cutting devices 14, of which only three are visible here. Thus, a first pair 15 of cutting devices 14 and a second pair 16 of cutting devices 14 are arranged in the cassette 4. The first pair 15 is in this case arranged for a first machining direction substantially parallel to a longitudinal axis of the holding arm of the tool holder 13, and the second pair 16 is arranged for a machining direction in the opposite direction.

Figure 2:
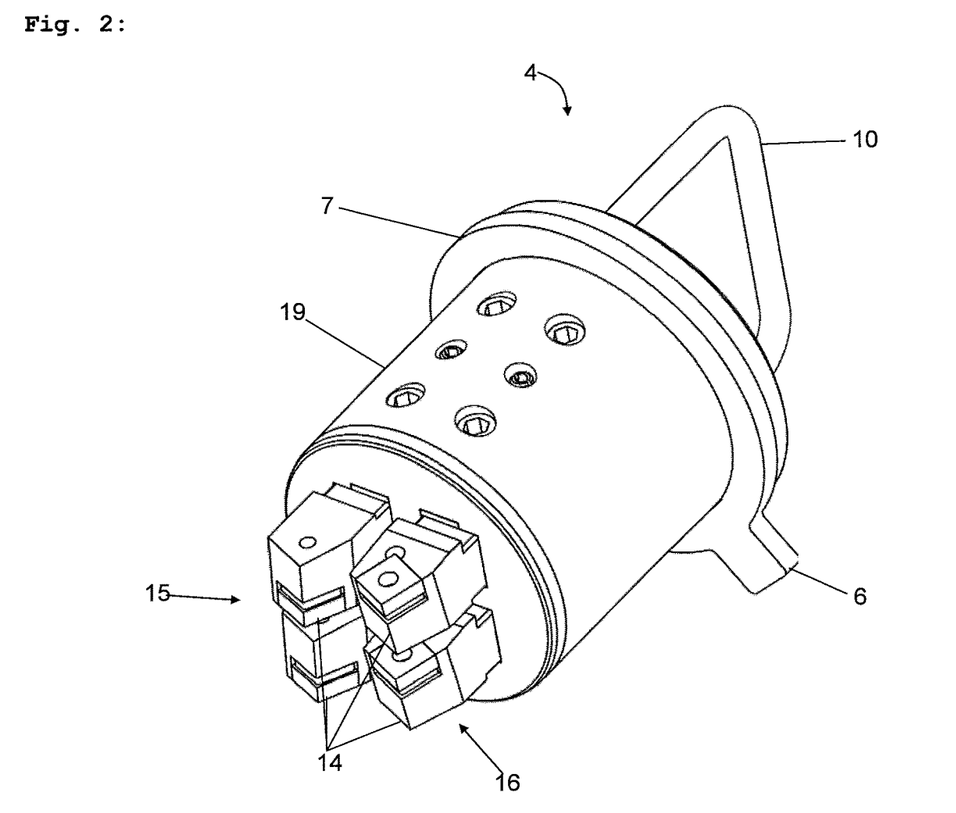
FIG. 2 shows a perspective illustration of a cassette according to the invention, as is received in the tool according to FIG. 1.

FIG. 2 illustrates a perspective illustration of a cassette 4 according to FIG. 1.

Identical reference signs denote identical features in all of the figures and are therefore only explained again as required.

Arranged on the cassette 4 comprising the casing 19 is a template 7 having a protrusion 6, said template 7 being able to engage in a complementary cutout or a gap in order to orient the cassette in the tool body. The template 7 is connected releasably to the cassette 4.

Figure 3:
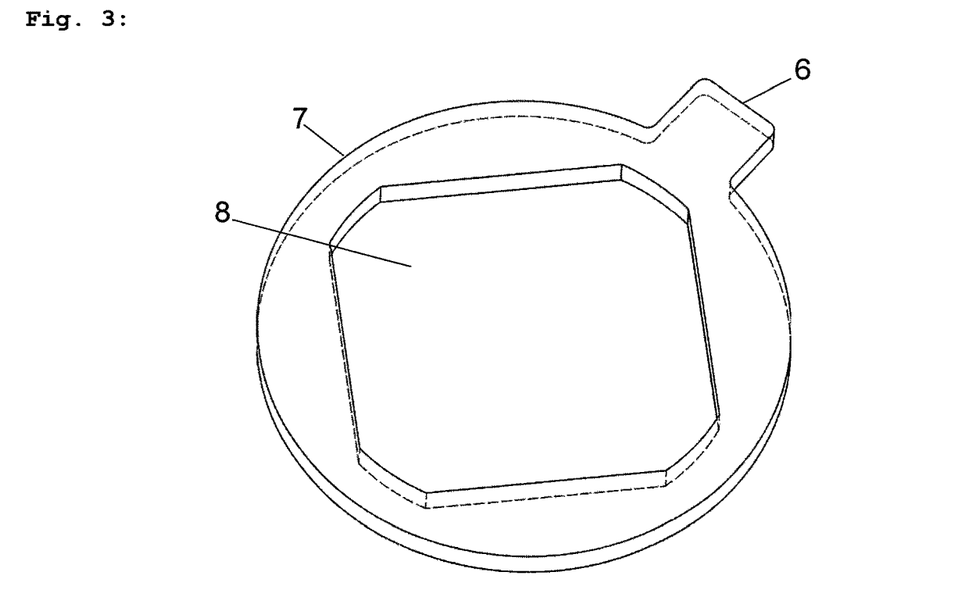
FIG. 3 shows a plan view of a template according to the invention for orienting the cassette according to FIG. 2.

FIG. 3 illustrates a plan view of a template 7 having a protrusion 6 according to FIG. 2. The template 7 has a template opening 8 in which the cassette can engage. The external shape of the cassette is substantially complementary at least sectionally to the shape of the template opening 8, such that the cassette takes up a defined orientation in the template opening 3.

Figure 4:
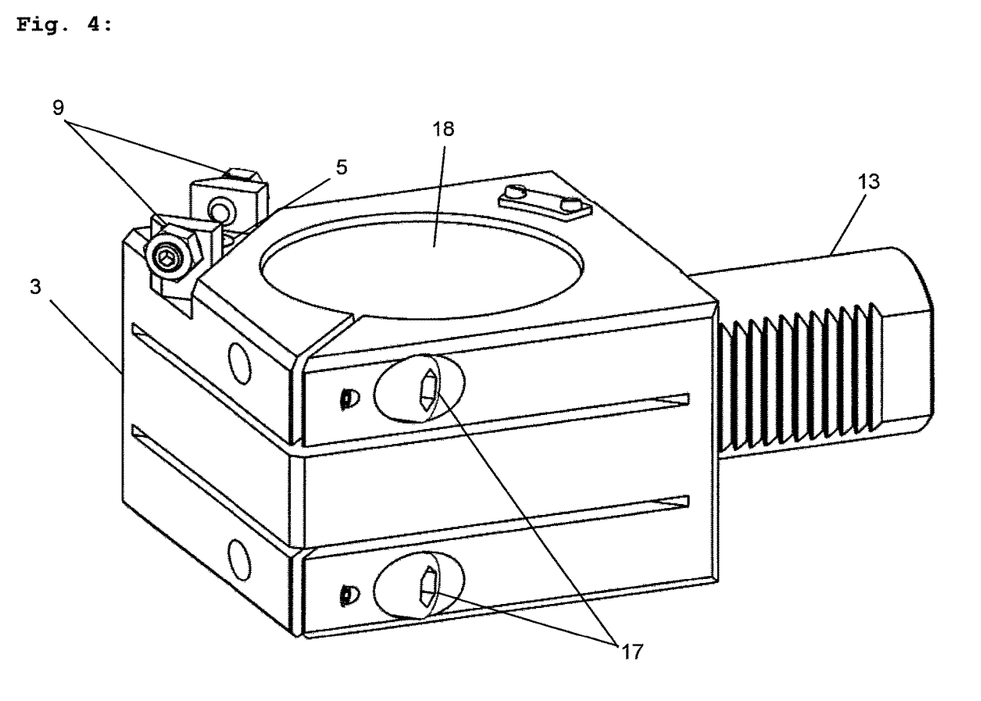
FIG. 4 shows a perspective illustration of a tool body according to the invention, as illustrated in FIG. 1.

FIG. 4 illustrates a perspective illustration of the tool body 3 according to FIG. 1.

The tool body 3 has a gap 5 for the protrusion arranged on the cassette, such that the cassette takes up a predetermined orientation in the tool body 3. In order to receive a cassette, the tool body 3 has a cassette receptacle 18.

Arranged at the gap 5 is a fastening device 9 which is configured here as two mutually opposite screws. In the engaged state of the protrusion in the gap 5, the screws are settable such that a force is exertable on opposite faces of the protrusion in order to fasten the protrusion in the gap 5, in particular by means of a friction fit.

Figure 5:
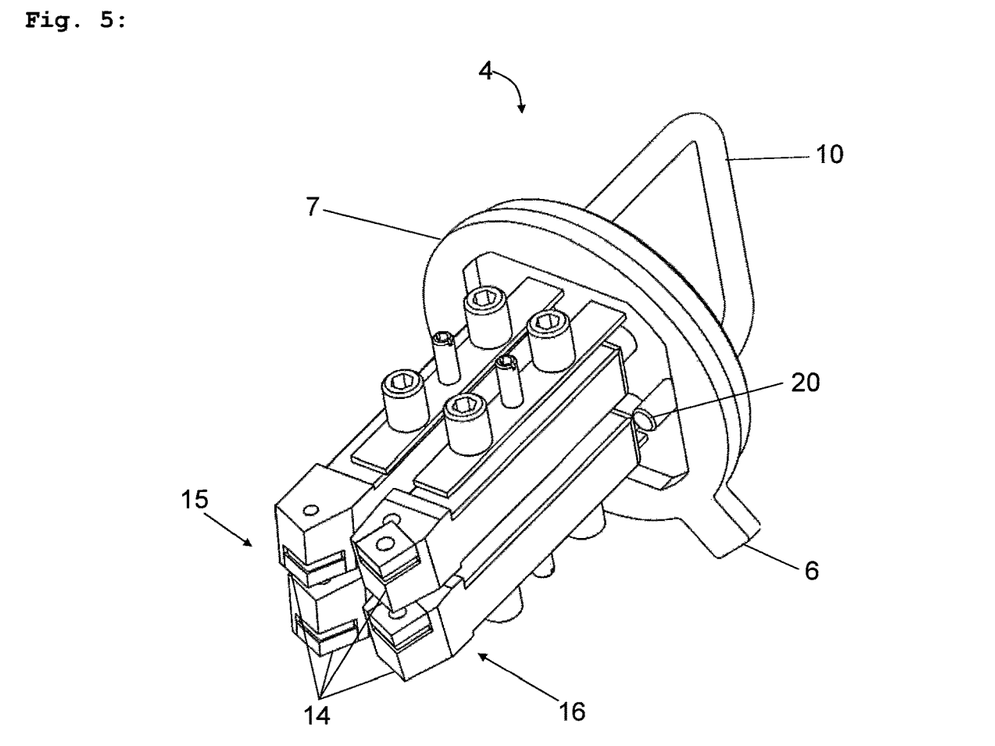
FIG. 5 shows a perspective illustration of the cassette according to the invention according to FIG. 2 without casing and base.

FIG. 5 illustrates the cassette 4 according to FIG. 2. In the present illustration, the casing and the base of the cassette 4 nave been omitted in order to reveal the arrangement of the cutting devices 14 in the cassette 4. The cassette 4 comprises a device 20, configured as screws, for fastening and orienting the casing, wherein only one of two screws is visible.

Figure 6:
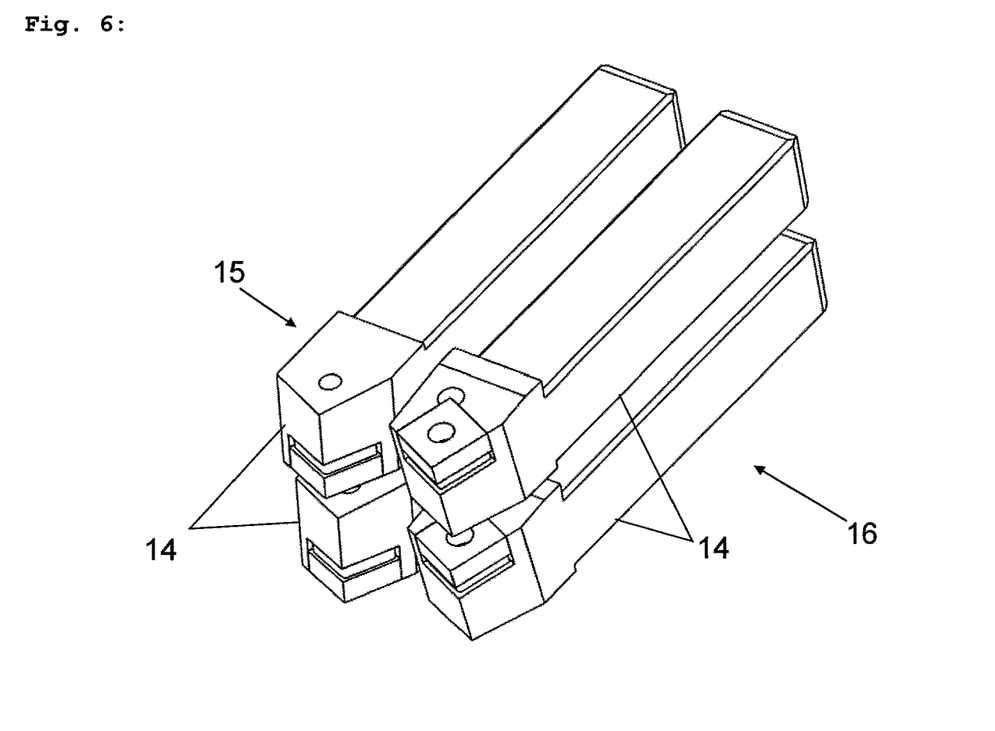
FIG. 6 shows a perspective illustration of four cutting devices for the tool according to the invention according to FIG. 1.

FIG. 6 illustrates a perspective illustration of the four cutting devices 14 as are arranged in the cassette according to FIG. 2. In order to visualize this arrangement better, all of the further parts of the cassette have been removed in the present illustration.

Figure 7:
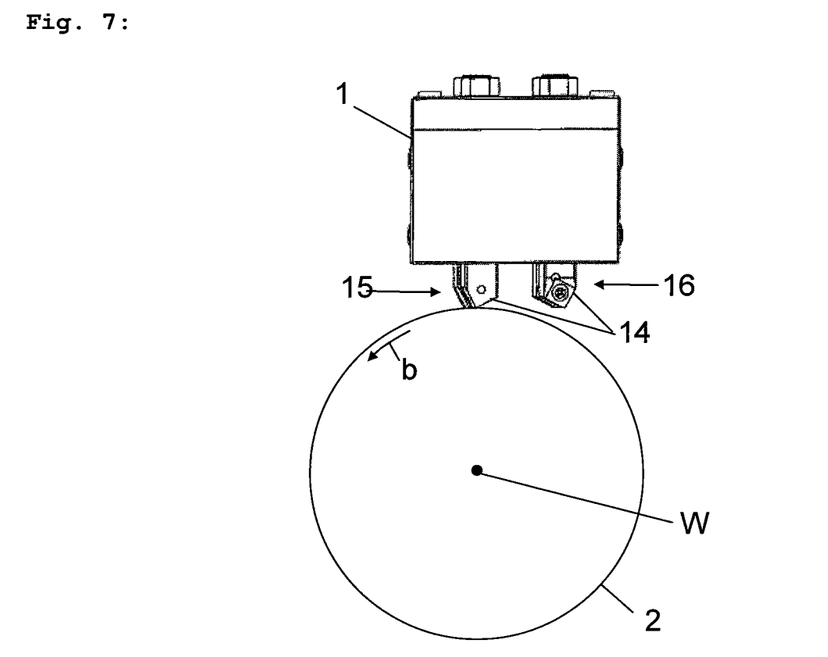
FIG. 7 shows a schematic illustration in a front view of an alternative tool according to the invention and of a roller for a first machining direction.

FIG. 7 shows a schematic illustration in a front view of an alternative tool 1 according to the invention, which is positioned on a roller 2.

The tool 1 comprises a first pair 15 and a second pair 16 of cutting devices 14. The cutting devices 14 of the first pair are arranged in a row. The cutting devices 14 of the second pair 16 are likewise arranged in a row, wherein the first pair 15 and the second pair 16 are arranged substantially parallel to one another. The first pair 15 is arranged for a first machining direction and the second pair 16 is arranged for a machining direction substantially in the opposite direction to the first machining direction.

The roller 2 is illustrated in the unmachined state. For machining, the roller 2 is rotated about the roller axis W in a first direction of rotation b. At the same time, the tool 1 is moved by means of a drive (not shown here) parallel to the direction of rotation mathematically defined along the sector b by the rotation of the roller 2, i.e. toward the observer from the plane of the drawing.

Figure 8:
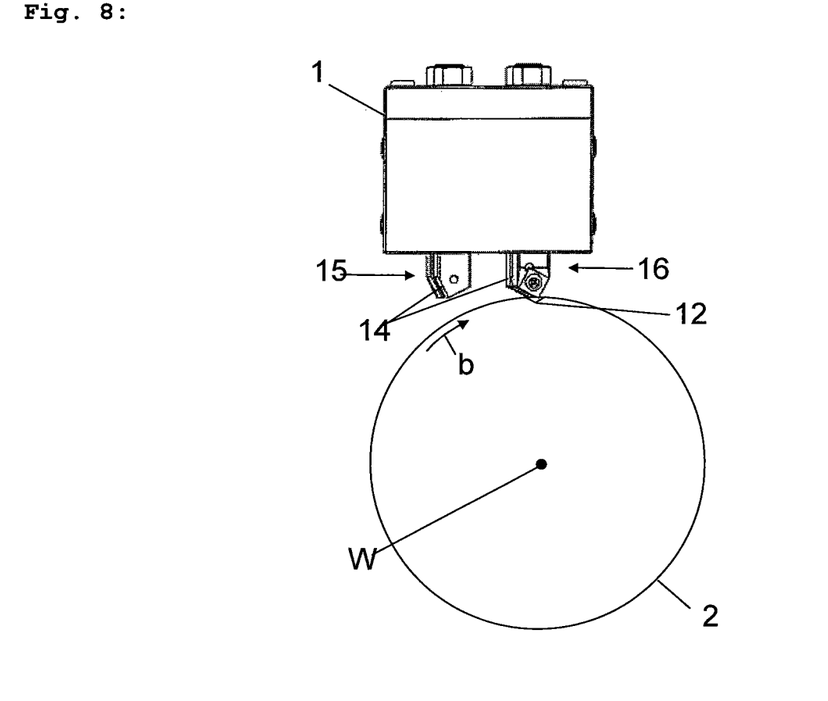
FIG. 8 shows a schematic illustration of the front view according to FIG. 7 of the tool according to the invention and of the roller for a second machining direction.

FIG. 8 shows the arrangement of the tool and roller according to FIG. 7 after the first machining step and the positioning of the second pair 16 of cutting devices 14 in a flute 12. This flute 12 was produced in the roller 2 during the machining step illustrated in FIG. 7.

For the further machining of the flute 12, the roller 2 is rotated in a second direction of rotation b through a negative angular section, which defines a direction of rotation in the mathematical sense into the plane of the drawing. Substantially at the same time, the tool 1 is moved parallel to the direction of rotation along the flute 12, for example in order to further deepen the flute 12.

Subsequently, the process can be repeated as often as required until the appropriate geometry of the flute 12 has been achieved, or the roller 2 has fluting on the entire roller surface.

Figure 9:
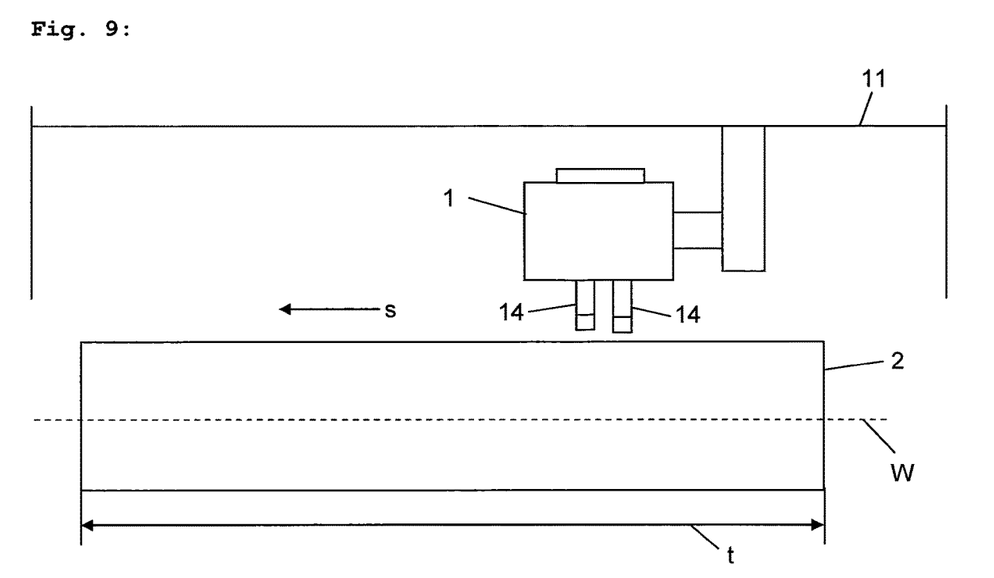
FIG. 9 snows a schematic illustration of a side view of a tool according to the invention with two cutting devices.

FIG. 9 schematically shows a side view of a tool 1 according to the invention having two cutting devices 14. The cutting devices 14 are arranged in a row with, one another.

The tool 1 is fastened to a linear drive 11 for moving the tool 1 in the machining direction s. The cutting devices 14 are configured such that only machining in the machining direction s and not in the opposite direction takes place.

The roller 2 having the roller axis W has a roller length t of 1600 mm, which is the maximum roller length t.

In order to machine the roller 2 with the tool 1, the tool 1 is positioned on the roller 2 and moved in the machining direction s by means of the linear drive 11. During the movement of the tool 1, the roller 2 is rotated about the roller axis W through an angular section.

During the return movement counter to the machining direction s after the roller 2 has been machined, the roller 2 is optionally rotated through a negative angular section in order to machine the previously machined section of the roller 2 again.

The cutting device 14 facing in the machining direction is at a smaller spacing from the tool body of the tool 1 than the cutting device 14 facing in the opposite direction to the machining direction s.

Figure 10:
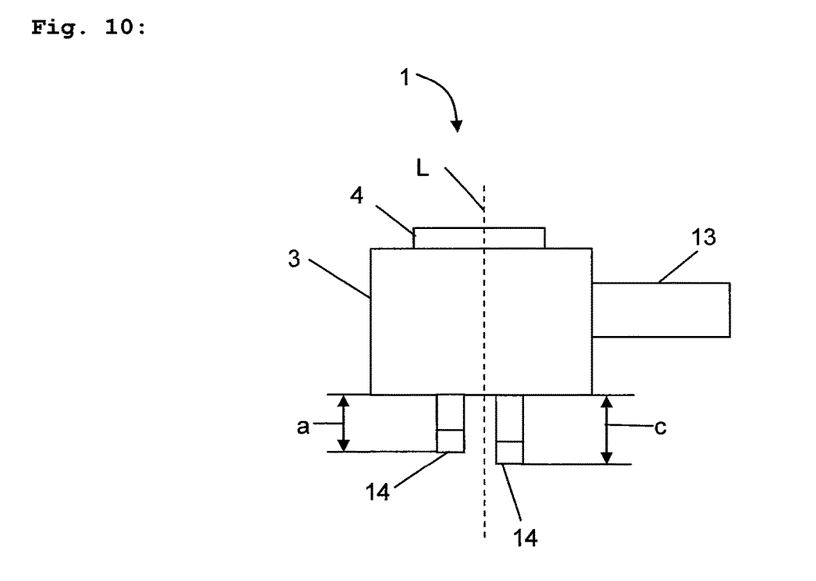
FIG. 10 shows an enlarged schematic illustration of the tool according to the invention according to FIG. 9.

FIG. 10 schematically illustrates the tool 1 according to FIG. 9 in an enlarged depiction. The tool 1 comprises the tool body 3 and the cassette 4, which comprises only two cutting devices arranged in a row. Along a longitudinal axis L of the tool 1, the cutting device 14 facing in the machining direction is at a first spacing a from the tool body and the cutting device facing in the opposite direction to the machining direction is at a second spacing c. The second spacing c is greater than the first spacing a. The difference between the second spacing c and the first spacing a is 0.1 mm, wherein the difference is illustrated in a greatly enlarged manner here.

Figure 11:
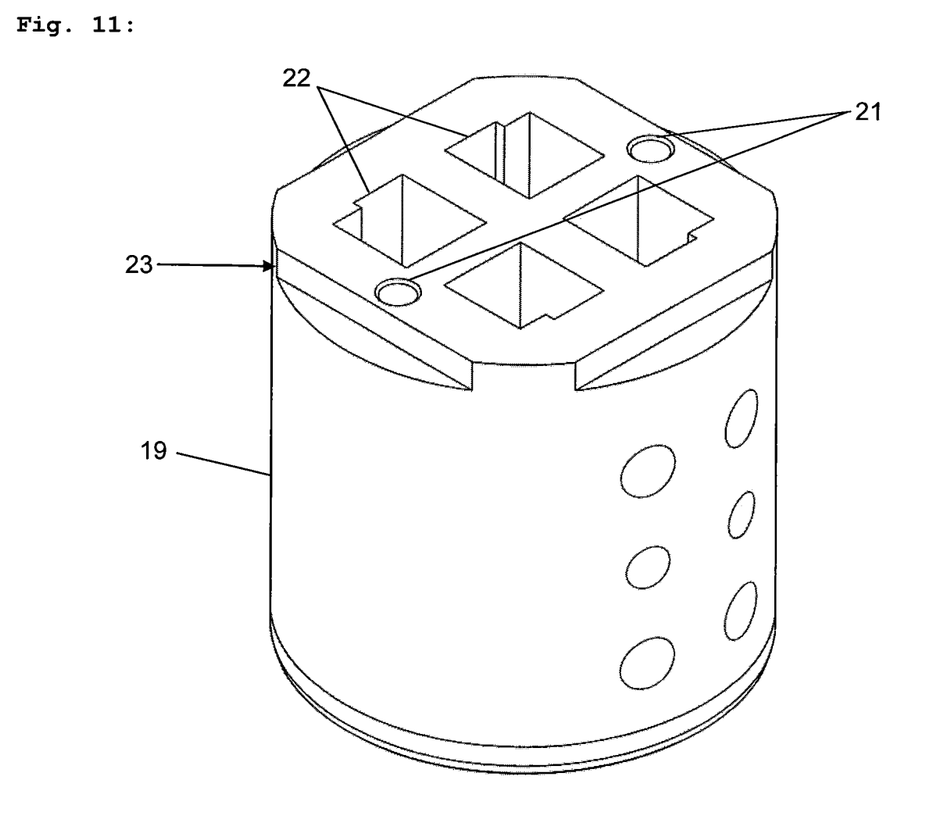
FIG. 11 shows a perspective illustration of the casing of the cassette according to FIG. 2.

FIG. 11 illustrates the casing 19 of the cassette according to FIG. 2.

Under normal conditions of use the casing 19 has on the side facing the handle, four openings 22 for receiving the four cutting devices. In addition, two orientation openings 21 for the engagement of the casing orientation device are provided.

The casing 19 additionally has, on the side facing the handle, an orientation section 23 for orienting the cassette in the template. The external shape of the casing 19 in the region of the orientation section 23 is substantially complementary to the shape of the template opening.

The invention claimed is:

1. A tool for machining of a workpiece,
   wherein the tool comprises a tool body and a cassette,
   at least one machining device is fastenable to and/or in the cassette,
   the tool has a positioning device for orienting the cassette in a predetermined position in the tool body,
   the positioning device comprises a gap arranged on the tool body, and
   a protrusion, for engaging in the gap, is arranged on a template, and the template has a template opening for receiving the cassette.

2. The tool according to claim 1, wherein an external shape of the cassette is substantially complementary at least sectionally to a shape of the template opening.

3. The tool as claimed claim 1,
   wherein the tool body comprises a cassette fastening means for securely mounting the cassette in the tool body, wherein the cassette fastening means is arranged on and/or in the tool body.

4. The tool as claimed in claim 3, wherein the cassette fastening means is arranged on and/or in the tool body by a friction fit.

5. The tool as claimed in claim 1, wherein the cassette has a handle.

6. A tool for machining of a workpiece,
   wherein the tool comprises a tool body and a cassette,
   at least one machining device is fastenable to and/or in the cassette,
   the tool has a positioning device for orienting the cassette in a predetermined position in the tool body,
   the positioning device comprises a gap arranged on the tool body,
   a protrusion for engaging in the gap is arranged on the cassette, and
   a fastening device for fastening the protrusion in the gap is arranged on and/or in the gap.

7. The tool as claimed claim 6, wherein the tool body comprises a cassette fastening means for securely mounting the cassette in the tool body, wherein the cassette fastening means is arranged on and/or in the tool body.

8. The tool as claimed in claim 7, wherein the cassette fastening means is arranged on and/or in the tool body by a friction fit.

9. The tool as claimed in claim 6, wherein the cassette has a handle.

10. A tool for machining of a workpiece,
    wherein the tool comprises a tool body and a cassette,
    at least one machining device is fastenable to and/or in the cassette,
    the tool has a positioning device for orienting the cassette in a predetermined position in the tool body,
    the machining device comprises at least two cutting devices arranged in a row such that, with respect to a machining direction, the cutting devices machine substantially the same regions of the workpiece one after the other, and
    the at least two cutting devices include a first cutting device facing in the machining direction located at a first spacing from the tool body smaller than a second spacing of a second cutting device facing in an opposite direction to the machining direction, with respect to a longitudinal axis of the tool.

11. A tool for machining of a workpiece,
    wherein the tool comprises a tool body and a cassette,
    at least one machining device is fastenable to and/or in the cassette,
    the tool has a positioning device for orienting the cassette in a predetermined position in the tool body, and
    the machining device comprises at least two cutting devices that are arranged substantially parallel to one another.

12. The tool as claimed in claim 11, wherein a first cutting device is arranged for a first machining direction and a second cutting device is arranged for a machining in a second direction substantially opposite to the first machining direction.

13. A set comprising:
    a cassette for a tool for machining of a workpiece,
      wherein the tool comprises a tool body and the cassette comprises at least one machining device,
      the machining device is receivable on and/or in the cassette;
      a protrusion for engaging in a gap in the tool body is arrangeable or arranged on the cassette;
    a template for the tool,
      wherein the template comprises a protrusion for engaging in the gap in the tool body, and
      the template has a template opening for receiving the cassette.

14. The set as claimed in claim 13, wherein an external shape of the cassette is substantially complementary at least sectionally to a shape of the template opening.

15. The set as claimed in claim 13, wherein the machining device is a cutting device.

16. The set as claimed in claim 13, wherein the machining device is releasably receivable on and/or in the cassette.

17. A method for fluting a roller by way of a tool, wherein the tool comprises a tool body and/or a cassette for receiving two pairs of at least two cutting devices, arranged substantially parallel to one another and in a row, a first pair of cutting devices is arranged for a first machining direction and a second pair of cutting devices is arranged for a second machining direction substantially opposite to the first machining direction, the method comprising the steps of:

positioning the first pair on the roller;

rotating the roller about the roller axis in a first direction of rotation and, at substantially the same time, moving the tool along the roller axis in the first machining direction in order to produce a flute in the roller;

positioning the second pair on and/or in the flute;

rotating the roller about the roller axis in a second direction of rotation and, at substantially the same time, moving the tool along the roller axis in the second machining direction along the flute.

18. The method as claimed in claim 17, wherein the method is performed by way of a tool for machining of a workpiece, wherein the tool comprises a tool body and a cassette, and at least one machining device is fastenable to and/or in the cassette, and the tool has a positioning device for orienting the cassette in a predetermined position in the tool body.

19. The method as claimed in claim 17, wherein rotating the roller about the roller axis in the first direction of rotation is performed through an angular section and rotating the roller about the roller axis in the second direction of rotation is performed through a negative angular section.

* * * * *